Re. 24947

Feb. 26, 1957    O. K. KELLEY    2,782,659

HYDROKINETIC TORQUE CONVERTER AND GEARING

Filed June 18, 1952    2 Sheets-Sheet 1

Inventor
Oliver K. Kelley
By Willits, Helmig & Baillio
Attorneys

Feb. 26, 1957     O. K. KELLEY     2,782,659
HYDROKINETIC TORQUE CONVERTER AND GEARING
Filed June 18, 1952     2 Sheets-Sheet 2

Inventor
Oliver K. Kelley
By Willits, Helwig & Baillio
Attorneys

United States Patent Office 2,782,659
Patented Feb. 26, 1957

2,782,659

HYDRODYNAMIC TORQUE CONVERTER AND GEARING

Oliver K. Kelley, Birmingham, Mich., assignor to General Motors Corporation, Detroit, Mich., a corporation of Delaware Application June 18, 1952, Serial No. 294,291

9 Claims. (Cl. 74—677)

This invention relates to hydrodynamic torque converters. It is particularly adapted to be used in the transmissions of motor vehicles, and will be described by way of example as applied to them, although it is not limited to such use.

I have previously proposed a torque converter including a pump circulating liquid through two turbines, one for starting and the other for principal driving, the starting turbine being connected to the output shaft of a transmission by a planetary reduction gear, arranged so that as the car picks up speed from a standing start the load is progressively and automatically transferred to the running turbine which is connected directly to the output shaft. While such arrangements are satisfactory and have advantages over previously known devices, I have discovered that they can be improved to provide higher starting torque and faster and smoother acceleration by eliminating a certain transitory negative torque which develops in the previously proposed converters. One of the objects of my invention, therefore, is to provide an improved torque converter having this advantage.

Other objects and advantages of the invention will appear in the description and accompanying drawings wherein.

Figure 1:
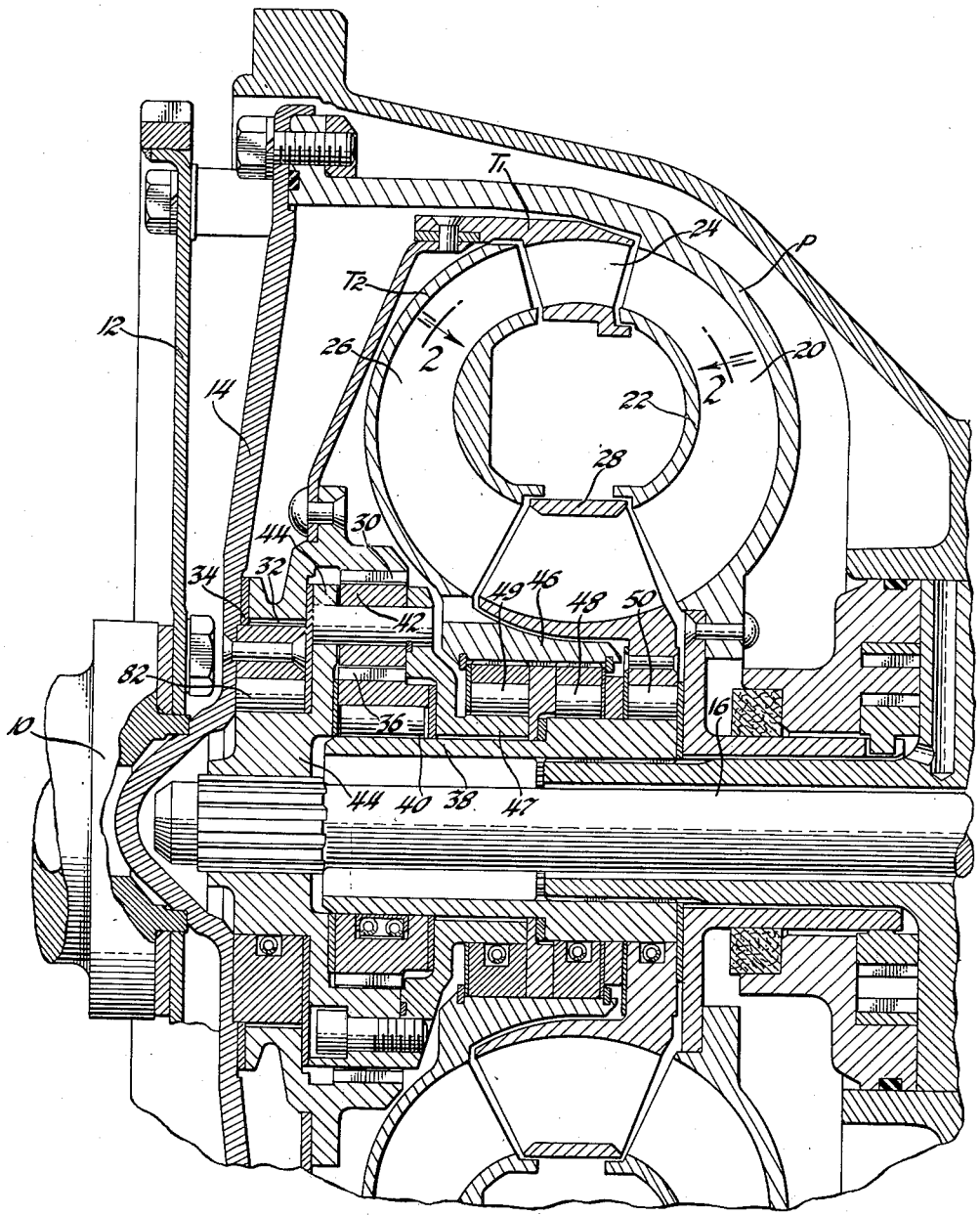
Fig. 1 is a longitudinal section of one form of my invention adapted to be embodied in an automobile transmission.

Referring to the drawings, 10 is any suitable prime mover such as an internal combustion engine having a flywheel 12, fastened to the casing 14 of a hydrodynamic torque converter driving an output shaft 16 connected in any suitable manner, not shown, to any desired load such as the driving wheels of an automobile. The torque converter has a pump P including blades 20 extending both radially and axially in any suitable known way, which with the casing 14 and any suitable core ring 22 form an impeller for circulating liquid, usually oil, through a first turbine T₁ having blades 24, a second turbine T₂ having blades 26 and a reaction roto-stator 28, so called because it is stationary under some conditions and rotates under other conditions, as is known. Between the first turbine T₁ and the output shaft 16 is a planetary gear set serving as a reduction gear to increase the starting torque delivered by the first turbine to the output shaft, to combine the torques of the two turbines, and to serve as means for automatically coupling the driving turbine to the load and permitting the starting turbine to idle. This gear set includes a driving gear, preferably the ring gear 30, directly connected to the first turbine T₁ and turning freely with respect to the output shaft. The ring gear may be supported by a radial bearing 32 and thrust bearing 34. A reaction gear, preferably the sun gear 36, is rotatably supported on a stationary sleeve 38. Between the sun wheel and the sleeve is any suitable one-way brake, represented by the ratchet or locking rollers 40 of known arrangement which permit the sun gear to rotate freely in the sense (or direction) of engine rotation and lock the gear to the sleeve whenever it tends to rotate in the opposite sense. Thus the sun gear is said to free wheel from ground with the engine. Planet gears 42 mesh with the sun gear and ring gear and are supported on a planet carrier 44 keyed to the output shaft 16. The second turbine is mounted on a hub 46 supported for rotation both on the stationary sleeve 38 and on a sleeve 47 integral with the planet carrier 44. Between the hub 46 and the sleeve 38 are ratchet rollers 48 which permit rotation of the second turbine in the sense of the pump; i. e., same as engine, and prevent rotation in the opposite sense. Between the hub of the second turbine and the sleeve 47 of the planet carrier are ratchet rollers 49 which lock the second turbine to the planet carrier, and thus to the output shaft 16, whenever the second turbine tends to rotate faster than the carrier, and permit the carrier to turn freely in the hub of the second turbine whenever the carrier tends to rotate faster than the turbine. This causes the second turbine to drive the planet carrier 44 and output shaft 16 when and only when that turbine tends to rotate faster than the shaft.

The reaction roto-stator is mounted on a one-way brake hub turning on the stationary sleeve 38 and having ratchet rollers 50 to permit rotation in the sense of the pump and to prevent rotation in the opposite sense as is customary.

The reasons for the construction and arrangement of the elements so far described and the manner of their operation are as follows:

Starting torque is conveyed to the vehicle wheels through the first turbine, the engine torque being multiplied by the inherent action of the turbine and further multiplied by the planetary reduction gear. The turbine applies torque to the ring gear. The sun gear locks to ground, and the planet carrier rotates, driving the output shaft free from the second turbine and slower than the first turbine.

It is relatively easy to design a turbine having high stall torque, that is one which will provide a high starting torque when the pump is rotating fast and the turbine is stationary. This is desirable to get the car in motion. But a good starting turbine is not the best cruising turbine. One reason is that the effectiveness of the turbine depends on the angle at which the oil delivered by the pump strikes the turbine blades, and this angle is inherently dependent on the relative speed of the turbine with respect to the pump. On starting this relative speed is high, because the pump is rotating fast and the turbine is stationary, or at best moving very slowly. At cruising speeds the turbine rotates faster and the pump may rotate slower so that the relative speed of the two is very low. Thus the angle of incidence of the oil on the turbine blades is greatly different in the two conditions. Therefore, a second turbine having different blade angles, is used for cruising.

Figure 2:
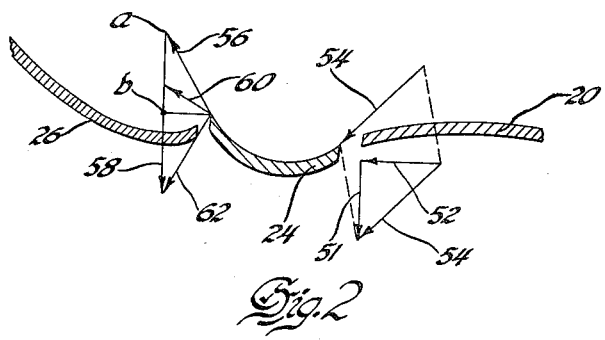
Fig. 2 is a diagrammatic showing of the blades, being a development of a partial section on the line 2—2 of Fig. 1.

The first turbine 24 is the starting turbine and the second 26 is the cruising turbine. A diagrammatic illustration of blade angles is in Fig. 2. If the torque converter is sliced along the chordal plane whose trace in Fig. 1 is the line 2—2, the blades, on looking toward the axis of the converter, will appear as in Fig. 2.

In starting, a given pump blade 20 is moving in the direction and at a speed represented by the velocity vector 51. Oil is delivered from the pump in an axial direction at a velocity represented in speed and direction, with respect to the pump blade, by the vector 52. Since at the same time the oil is being carried around the surface of a cylinder whose axis is that of the pump at a tangential velocity represented by the vector 51, the oil is thus discharged from the pump at an absolute velocity represented by the resultant vector 54. It is clear from the drawing that this tends to push the turbine forward, that is, to rotate it in the sense of rotation of the pump. This supplies the torque that starts the car. The oil flows along the surface of the turbine blade 24 so that it is discharged from the first turbine at a velocity (with respect to the blade) represented by the vector 56, which is substantially tangent to the inner face of the blade at its discharge edge. It is plain from the drawing that this strikes the second turbine blade 26 in a direction which tends to rotate the second turbine backwards when the first turbine is at rest, which is the condition on starting. But when the first turbine moves and begins to increase in speed, the oil is carried around by its blades at a progressively increasing tangential velocity represented by the vector 58. Thus the velocity at which the oil strikes the second turbine blade is represented in value and direction by a resultant velocity vector such as 60 or 62. When the speed of rotation of the first turbine is less than the value represented by a—b on vector 58 the resultant 60 is in such direction that the oil continues to exert negative torque on the second turbine blades. This negative torque cannot be transmitted to the output shaft because the free-wheeling clutch 49 lets the carrier turn forward in the hub 46 of the second turbine. This prevents the second turbine from opposing the first turbine on starting, as has happened in previous attempts to use two turbines. It is even undesirable to permit the second turbine, during this period to turn backwards absolutely, that is with reference to the stationary sleeve 38, although it cannot transmit torque to the shaft, because backward rotation produces shock and turbulence in the roto-stator, and seriously reduces the overall torque ratio and the overall efficiency of the converter. It is for this reason that the one-way brake 48 is used to hold the second turbine against any reverse rotation at all. As the first turbine picks up speed, the length of the tangential velocity vector 58 increases. When it gets longer than a—b, the resultant 62 is in such direction that the oil tends to move the second turbine blades forward, that is in the sense of rotation of the pump, and the second turbine increases in speed until it reaches the speed of the planet carrier, which is driven by the first turbine, but slower due to the speed reduction of the planet gear set. At this point the one-way clutch 49 picks up the carrier and the second turbine drives it and the output shaft by direct mechanical engagement. The torque transmitted by the second turbine at this point is very low while the torque transmitted by the first turbine is very high. As the first turbine continues to increase in speed, the second turbine also increases in speed, and the vector 58 also increases in length until the resultant vector 62 is substantially identical in direction and length with the pump resultant vector 54. At this point no torque is transmitted by the first turbine and total torque is transmitted by the second turbine. As the car speed is further increased, the second turbine continues to transmit the total torque to the output shaft and the first turbine and the reaction sun gear free wheel.

Figure 3:
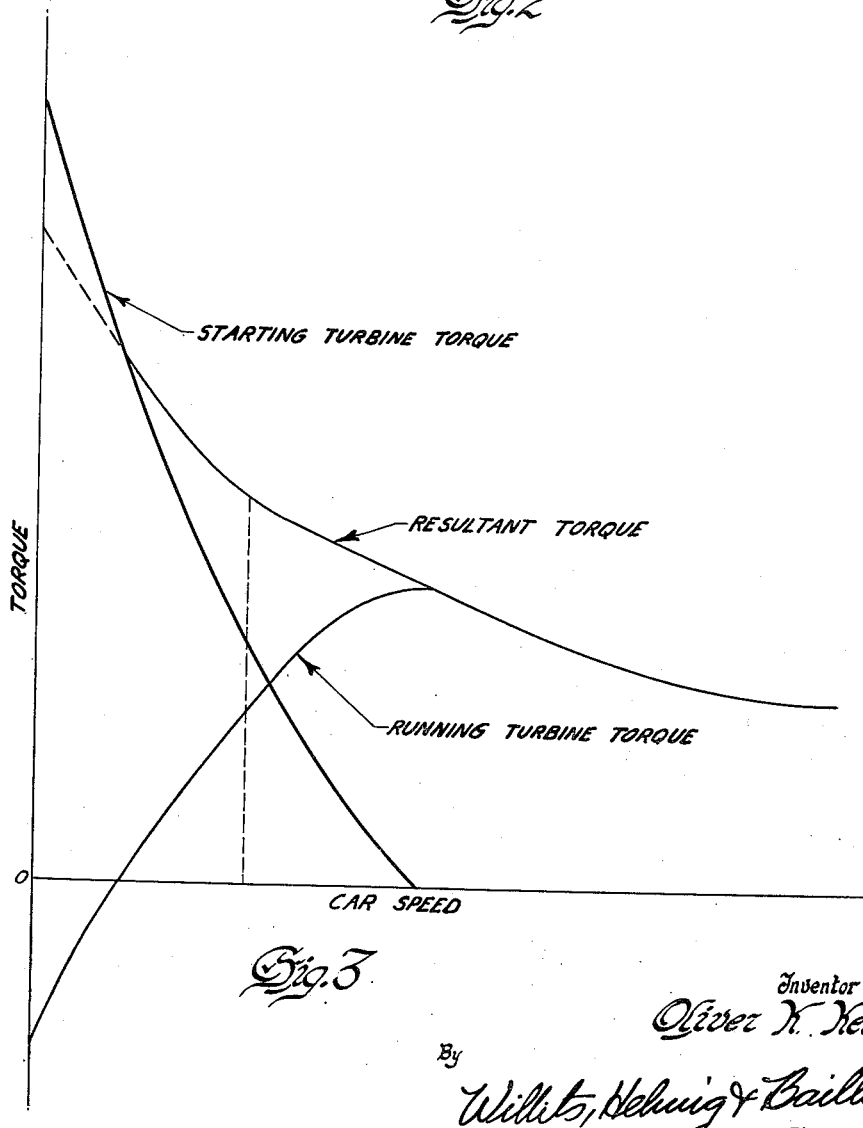
Fig. 3 is a set of curves showing operating characteristics of my improved transmission.

It is characteristic of hydrodynamic torque converters that as the load (opposing torque) decreases, the turbine increases in speed. Typical relationships between torque and speed are represented by curves of the general character shown in Fig. 3, wherein torque as ordinates is plotted against speed of the output shaft as abscissae. The speed-torque characteristics of the first or starting turbine alone as effected by the reduction gear has high torque at stall and at very low speeds, the torque falling off very rapidly as the speed increases as shown by the curve marked starting turbine torque. The second turbine alone, as affected by the presence of the first turbine has characteristics represented by the curve marked running turbine torque showing good torque at the higher speed ranges, but undesirably low starting torque, and even negative torque at stall. The blades are designed so that before the torque of the starting turbine has dropped to an impractically low value, the torque of the cruising turbine has not only become positive but exceeds the torque of the starting turbine and has therefore picked up the load. The resultant torque delivered by the converter is shown by line marked resultant torque which is determined simply by adding the ordinates of the two turbine curves, leaving out the negative part of the curve of the running turbine, because this is eliminated by the one-way clutch 47 and one way brake 48. This resultant is a smooth curve representing very high starting torque, smooth and rapid pick up in speed and satisfactory torque at cruising speeds.

As is known in torque converter practice the oil is discharged from the second turbine with a large backward tangential component. This backward direction is reversed by the blades of the reaction element and the oil is delivered to the pump with a forward component. This exerts backward torque on the reaction element which is held against backward rotation by the one-way brake 50, and while so held the reaction element is stationary and is therefore called a stator. In the initial stages of accelerating the car the entire torque is delivered to the output shaft by the first turbine through the planet carrier. When the speed of the second turbine permits the clutch 49 to pick up the planet carrier, torque is supplied to the carrier by both turbines, the reaction gear remaining locked by its one way brake. As the second turbine accelerates still more, the torque of the first turbine falls off and the second turbine gradually picks up the entire load. When it does the first turbine continues to rotate, delivering substantially no torque, but turning idly. During this stage the sun gear and ring gear both rotate idly with the carrier.

Eventually the turbines approach the speed of the pump, the reaction element begins to rotate forward, ceasing its function as a reaction element, and the entire torque converter takes on the characteristics of a fluid coupling, driving substantially at unit speed ratio.

It will be observed that all torque between engine and output shaft effected by the parts so far described is transmitted from the engine to the output shaft through the planet carrier which is fast on the shaft. But if the car tends to run faster than the engine the brake 40 and clutch 49 prevent the overtaking torque in the output shaft from being transmitted back to the torque converter through the carrier. Thus the car would be a free-wheeling vehicle unless something were done to avoid it. To prevent free-wheeling and obtain better braking with the engine directly connected to the car wheels, I prefer to connect the carrier to the pump casing by over-running clutch rollers 82 arranged to transmit torque to the engine when the shaft 16 rotates faster than the engine. This has the further advantage of permitting the engine to be started by pushing the car whenever the output shaft 16 is connected to the wheels, which can be done by any suitable means not shown. Thus I have provided a transmission having all the advantages of hydrokinetic drive in all driving of the car by the engine and all the advantages of direct mechanical drive whenever the car tends to drive the engine.

I claim:

1. A power transmitting device comprising in combination an input shaft rotating a pump in one sense for circulating liquid, an output shaft, a first turbine rotated by liquid from the pump and mounted on a freely rotatable driving gear, a fixed support, a reaction gear rotatable about the output shaft, a one-way brake between the reaction gear and the support permitting rotation of the reaction gear in the sense of rotation of the pump, a planet carrier having a driving connection with the output shaft, planet gears meshing with the driving and reaction gears, a second turbine rotated by liquid flowing from the first turbine, second turbine being adapted to be urged to rotate in either sense by liquid flowing from the first turbine, an over-running clutch connecting the second turbine to the carrier in response to second turbine speed tending to exceed carrier speed in the sense of rotation of the pump, a one-way brake connecting the second turbine to the support to prevent reverse rotation, and an over-running clutch connecting the input shaft directly to the output shaft around said pump and turbines to transmit torque from the output shaft to the input shaft whenever the speed of the output shaft in the sense of rotation of the pump tends to exceed the speed of the input shaft.

2. A hydrodynamic torque converter comprising in combination an output shaft, a pump adapted to be rotated forward to circulate liquid successively through a first turbine adapted to drive the output shaft forward, a second turbine adapted to drive the output shaft forward and a reaction member; the pump being adapted to deliver liquid to the first turbine at an absolute velocity having a forward tangential component, the first turbine being adapted to direct liquid to the second turbine at a relative velocity with respect to the second turbine which has a backward tangential component, the second turbine being adapted to deliver liquid to the reaction member at a relative velocity with respect to the second turbine having a backward tangential component, and the reaction member being adapted to deliver liquid to the pump at an absolute velocity having a forward tangential component; speed reducing means connecting the first turbine to rotate the shaft at a speed less than that of the first turbine; and second means adapted to connect the second turbine to the shaft, the second means being responsive to the condition of second turbine forward speed tending to exceed forward shaft speed for connecting the second turbine to the shaft and responsive to the condition of second turbine forward speed being less than shaft forward speed for disconnecting the second turbine from the shaft.

3. A hydrodynamic torque converter comprising in combination an output shaft, a pump adapted to be rotated forward to circulate liquid successively through a first turbine adapted to drive the output shaft forward, a second turbine adapted to drive the output shaft forward and a reaction member; the pump being adapted to deliver liquid to the first turbine at an absolute velocity having a forward tangential component, the first turbine being adapted to direct liquid to the second turbine at a relative velocity with respect to the second turbine which has a backward tangential component, the second turbine being adapted to deliver liquid to the reaction member at a relative velocity with respect to the second turbine having a backward tangential component, and the reaction member being adapted to deliver liquid to the pump at an absolute velocity having a forward tangential component; a planetary gear set including a driving gear connected to the first turbine, a reaction gear, a planet carrier connected to the output shaft and planet gears journalled in the carrier and meshing with the reaction and driving gears; means permitting the reaction gear to rotate forward and preventing backward rotation; and means for transmitting forward torque directly from the second turbine to the carrier and for preventing transmission of reverse torque from the second turbine to the carrier.

4. A hydrodynamic torque converter comprising in combination an output shaft, a pump adapted to be rotated forward to circulate liquid successively through a first turbine adapted to drive the output shaft forward, a second turbine adapted to drive the output shaft forward and a reaction member; the pump being adapted to deliver liquid to the first turbine at an absolute velocity having a forward tangential component, the first turbine being adapted to direct liquid to the second turbine at a relative velocity with respect to the second turbine which has a backward tangential component, the second turbine being adapted to deliver liquid to the reaction member at a relative velocity with respect to the second turbine having a backward tangential component, and the reaction member being adapted to deliver liquid to the pump at an absolute velocity having a forward tangential component; a planetary gear set including a driving gear connected to the first turbine, a reaction gear, a planet carrier connected to the output shaft and planet gears journalled on the carrier and meshing with the reaction and driving gears; means permitting the reaction gear to rotate forward and preventing reverse rotation; and an overrunning clutch between the second turbine and the output shaft, said clutch being automatically operative to connect the second turbine directly to the shaft when the forward speed of rotation of the second turbine tends to exceed the forward speed of the shaft.

5. A hydrodynamic torque converter comprising in combination an output shaft, a pump adapted to be rotated forward to circulate liquid successively through a first turbine adapted to drive the output shaft forward, a second turbine adapted to drive the output shaft forward and a reaction member; the pump being adapted to deliver liquid to the first turbine at an absolute velocity having a forward tangential component, the first turbine being adapted to direct liquid to the second turbine at a relative velocity with respect to the second turbine which has a backward tangential component, the second turbine being adapted to deliver liquid to the reaction member at a relative velocity with respect to the second turbine having a backward tangential component, and the reaction member being adapted to deliver liquid to the pump at an absolute velocity having a forward tangential component; a stationary support; a sun gear rotatably mounted on the support and coaxial with the shaft; an overrunning brake connecting the sun gear to the support to permit forward rotation and prevent reverse rotation; a freely rotatable ring gear coaxial with the sun gear; a driving connection between the first turbine and the ring gear; a planet carrier connected to the shaft; planet gears journalled on the carrier and meshing with the sun and ring gears; and an overrunning clutch directly connecting the second turbine to the planet carrier whenever the forward speed of the second turbine tends to exceed the forward speed of the carrier.

6. A hydrodynamic torque converter comprising in combination an output shaft, a pump adapted to be rotated forward to circulate liquid successively through a first turbine adapted to drive the output shaft forward, a second turbine adapted to drive the output shaft forward and a reaction member; the pump being adapted to deliver liquid to the first turbine at an absolute velocity having a forward tangential component, the first turbine being adapted to direct liquid to the second turbine at a relative velocity with respect to the second turbine which has a backward tangential component, the second turbine being adapted to deliver liquid to the reaction member at a relative velocity with respect to the second turbine having a backward tangential component, and the reaction member being adapted to deliver liquid to the pump at an absolute velocity having a forward tangential component; a planetary gear set including a driving gear connected to the first turbine, a reaction gear, a planet carrier connected to the shaft, and planet gears journalled on the carrier and meshing with the driving and reaction gears; a stationary support rotatably supporting the reaction gear; an overrunning brake between the reaction gear and the support permitting forward rotation of the reaction gear and preventing reverse rotation; an overrunning clutch directly connecting the second turbine to the carrier whenever the speed of forward rotation of the second turbine tends to exceed the forward speed of the carrier; and an overrunning brake between the second turbine and the support preventing reverse rotation of the second turbine.

7. A hydrodynamic torque converter comprising in combination a pump adapted to be rotated forward to circulate liquid successively through a first turbine, a second turbine, and a hydraulic reaction means; an output shaft; a driving gear freely rotatable about the output shaft; a reaction gear freely rotatable about the output shaft; a fixed support, the first turbine being connected to the driving gear and adapted to rotate forward; a one-way brake between the reaction gear and fixed support permitting rotation of the reaction gear only forward; a planet carrier having a driving connection with the output shaft; planet gears journalled on the carrier and meshing with the driving and reaction gears; the second turbine being adapted to be urged to rotate either forward or backward by liquid flowing from the first turbine, an overrunning clutch connecting the second turbine to the carrier in response to second turbine forward speed tending to exceed output shaft speed, and a one-way brake connecting the second turbine to the support to prevent reverse rotation.

8. A hydrodynamic torque converter comprising in combination a pump adapted to be rotated forward to circulate liquid successively through a first turbine, a second turbine, and a hydraulic reaction means; an output shaft, a driving gear freely rotatable about the output shaft; a reaction gear freely rotatable about the output push shaft; a fixed support; the first turbine being connected to the driving gear and adapted to rotate forward; a one-way brake between the reaction gear and fixed support permitting rotation of the reaction gear only forward; a planet carrier having a driving connection with the output shaft; planet gears journalled on the carrier and meshing with the driving and reaction gears; the second turbine being adapted to be urged to rotate either forward or backward by liquid flowing from the first turbine, and an overrunning clutch connecting the second turbine to the carrier in response to second turbine forward speed tending to exceed output shaft speed.

9. A hydrodynamic torque converter comprising in combination a pump adapted to be rotated in one sense to circulate liquid successively through a first turbine, a second turbine and a hydraulic reaction means; an output shaft; a ring gear freely rotatable about the output shaft; a reaction sun gear freely rotatable about the output shaft; a fixed support; a first turbine being connected to the ring gear and adapted to rotate in the sense of the pump; a one-way brake between the sun gear and the fixed support permitting rotation of the sun gear only in the sense of rotation of the pump; a planet carrier having a driving connection with the output shaft; planet gears journalled on the carrier and meshing with the ring and sun gears; the second turbine being adapted to be urged to rotate in either sense by liquid flowing from the first turbine; and an overrunning clutch connecting the second turbine to the carrier in response to second turbine forward speed tending to exceed output shaft forward speed.

References Cited in the file of this patent

UNITED STATES PATENTS

| | | |
|---|---|---|
| 2,238,748 | Patterson | Apr. 15, 1941 |
| 2,293,358 | Pollard | Aug. 18, 1942 |
| 2,351,213 | James | June 13, 1944 |
| 2,550,082 | Orr | Apr. 24, 1951 |
| 2,578,450 | Pollard | Dec. 11, 1951 |
| 2,590,472 | Soper et al. | Mar. 25, 1952 |
| 2,616,309 | Russell | Nov. 4, 1952 |

FOREIGN PATENTS

| | | |
|---|---|---|
| 666,092 | Great Britain | Feb. 6, 1952 |